(12) United States Patent
Sid-Ahmed

(10) Patent No.: US 6,254,989 B1
(45) Date of Patent: Jul. 3, 2001

(54) PNEUMATIC TIRE INCLUDING GAS ABSORBING CORDS

(75) Inventor: Abdel-Hadi Sid-Ahmed, Alpharetta, GA (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 08/047,343

(22) Filed: Dec. 1, 1992

Related U.S. Application Data

(62) Division of application No. 07/698,527, filed on May 10, 1991, now Pat. No. 5,221,382.

(51) Int. Cl.$^7$ ..................................................... D02G 3/00
(52) U.S. Cl. ........................... 428/398; 428/364; 428/359
(58) Field of Search .................................... 428/364, 359, 428/348; 156/87, 130.3; 57/248, 253, 902; 152/451, 563, 527, 556

(56) References Cited

U.S. PATENT DOCUMENTS

| | | | | |
|---|---|---|---|---|
| 1,875,517 | * | 9/1932 | Steere . | |
| 2,541,506 | * | 2/1951 | Cuthbertson et al. | 154/14 |
| 2,770,282 | * | 11/1956 | Herzegh | 152/330 |
| 3,024,827 | * | 3/1962 | Hough | 152/330 |
| 3,552,468 | * | 1/1971 | Gallagher | 152/359 |
| 4,073,330 | * | 2/1978 | Allard | 156/361 |
| 4,363,346 | * | 12/1982 | Pepe | 156/356 |
| 4,862,939 | * | 9/1989 | Merle | 152/452 |

* cited by examiner

*Primary Examiner*—Merrick Dixon
(74) *Attorney, Agent, or Firm*—David E Wheeler

(57) ABSTRACT

Elastomeric articles are rendered less susceptible to blow or blister defects by providing, in at least one cord reinforcement ply of an article, a plurality of gas absorbing bleeder cords with the reinforcement cords and gas absorbing cords lying in the same general plane and with the gas absorbing cords consisting of staple hollow filaments. The gas absorbing cords may be used as fill yarn in weaving fabric employing parallel reinforcement cords.

7 Claims, 1 Drawing Sheet

PNEUMATIC TIRE INCLUDING GAS ABSORBING CORDS

This is a divisional of application Ser. No. 07/698,527, filed on May 10, 1991, now U.S. Pat. No. 5,221,382.

BACKGROUND OF THE INVENTION

This invention relates to pneumatic tires and more particularly to a novel and improved tire cord fabric and the use thereof in a pneumatic tire to reduce defects in tires known as blows.

In the curing of a pneumatic tire the presence of air or other compressible gases within the body of the tire being cured may cause defects which are known as blows or blisters. These defects may involve local separation between the rubber and one or more of the reinforcement cords which make up the reinforcing ply of a pneumatic tire. Air may become trapped in or between the layers of materials which are superimposed in the course of building the tire or may in some instances enter into the tire during the time lapse between the building of the tire and the placing of the tire into a mold in which it will be cured. Occasionally small quantities of air may be forced into the body of the tire by the closing of the mold.

It has been known in the art that tire reinforcement cords contain passages extending generally throughout the length of the cord, lying between and bounded by the filaments which make up the cords, and that air or other gases can travel along such passages. It has been observed that the treatment of tire reinforcement cords such as stretching of heated cords, for example cords made of continuous synthetic resin filament materials such as polyester and nylon, tends to significantly reduce the cross sectional area of the interfilamentary passages. Stretching of heated cords may result in a reduction of a cross sectional area of the individual filaments and a compacting of the filaments more closely to one another.

During the time that the tire is being vulcanized by the application of heat and pressure thereto, any air trapped within the tire or any gases generated during the vulcanization of the tire may be sufficient in volume to prevent the development of a satisfactory bond between the rubber material and the reinforcing cords within the tire or may break such bonds by forcing a separation between the rubber and the reinforcement cords. The resulting defects are known as blisters or blows. Examples of attempts to minimize such blisters or blows are described in U.S. Pat. Nos. 2,541,506, 3,552,468 and 4,363,346.

SUMMARY OF THE INVENTION

In accordance with one aspect of the present invention an elastomeric article, in the illustrated embodiment a pneumatic tire, is provided with at least one reinforcement ply wherein the reinforcement ply includes a plurality of reinforcing cords embedded in rubber or rubber-like material, the reinforcing cords extending in parallel spaced apart relation. The reinforcing ply further includes a plurality of gas absorbing cords, wherein the gas absorbing cords are used as weft cords to hold the reinforcing cords in a stable relationship relative to one another. Each gas absorbing cord consists of a multiplicity of staple filaments of a material or materials selected from the group consisting of nylon, rayon, polyester or glass. Each gas absorbing cord is completely surrounded by rubber or rubber-like material forming the ply. In the preferred embodiment, the gas absorbing cords are hollow bleeder cords.

DETAILED DESCRIPTION OF THE INVENTION

Figure 1:
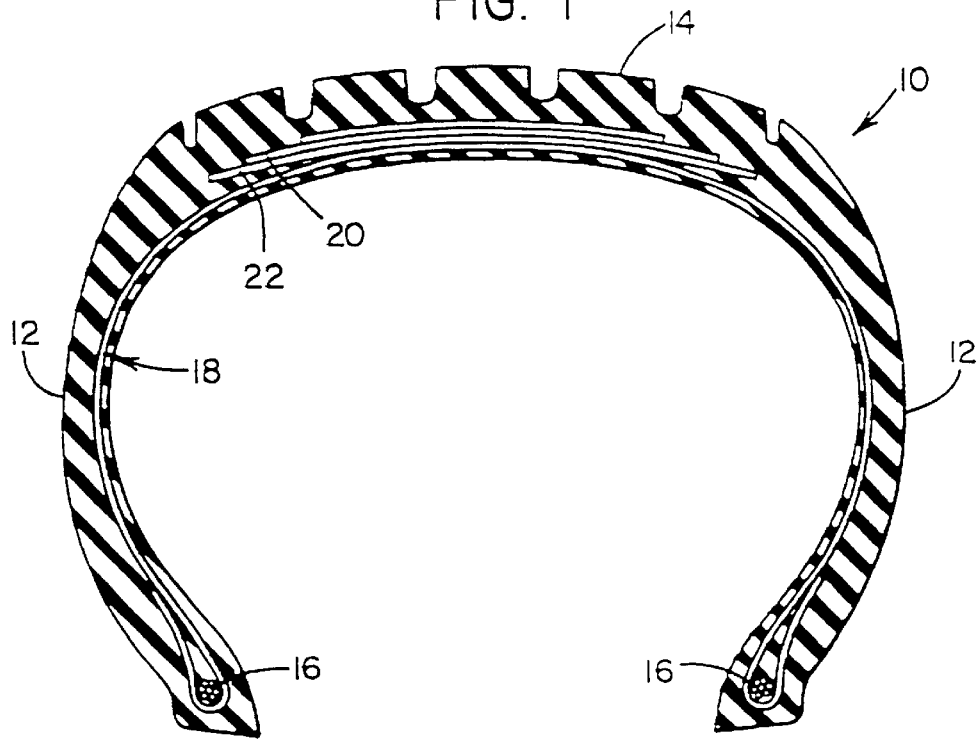
FIG. 1 is a cross-sectional view of a pneumatic tire incorporating and made in accordance with the present invention, with the view taken in a plane extending radially of and containing the rotational axis of the tire.

With reference to FIG. 1, there is shown a pneumatic tire, generally indicated at 10, which comprises a pair of sidewall portions 12 terminating at their radially outer ends in a tread portion 14 and at their radially inner ends in a pair of beads 16. When the term "radially" is used herein, it means "in a direction radially of the tire rotational axis", and where the term "axially" is used herein, it means in the direction of the rotational axis of the tire. The tire further comprises at least one reinforcement ply 18 connected to each of the beads 16 and extending through the sidewalls of the tire and under the tread portion 14. The tire may have one or more of such reinforcement plies which are generally referred to as carcass plies. The tire 10 may further include additional reinforcing plies in the form of one or more breaker or belt plies 20, 22 disposed in the crown region of the tire between the carcass ply 18 and the tread 14.

The tire 10 may have a bias, bias belted, or radial ply construction. In each case the reinforcing ply 18 is composed of a plurality of reinforcing cords extending in parallel spaced apart relation. In the case of a bias tire construction, these reinforcing cords extend at a suitable angle to the mid-circumferential center plane of the tire at the circumferential centerline of the carcass ply 18, which angle may be, for example, from 25 to 40 degrees. The same would be true if the tire were of a bias belted construction. In a radial ply construction, the cords of the carcass ply 18 will extend substantially radially of the tire, for example, at an angle from 80 to 90 degrees to the mid-circumferential center plane of the tire.

The breaker or belt plies such as 20 and 22 shown in FIG. 1 each also include a plurality of reinforcing cords extending in parallel spaced apart relation. The cords will extend at a relatively low angle, for example, 15 to 25 degrees when the belt plies 20, 22 are used in combination with a radial ply carcass and at a somewhat higher angle, perhaps 25 to 35 degrees when used in conjunction with a bias ply carcass either as a belt or as breaker plies. Where the breaker or belt plies 20, 22 are used in conjunction with a bias belted tire, the cords will have an angle at the mid-circumferential centerline of the tire which is normally at least 5 degrees less than the corresponding angle of the carcass ply or plies, and where used as a breaker in conjunction with a bias tire will have an angle at the mid-circumferential centerline of the tire which is equal or approximately equal to the corresponding angle of the carcass plies.

Figure 2:
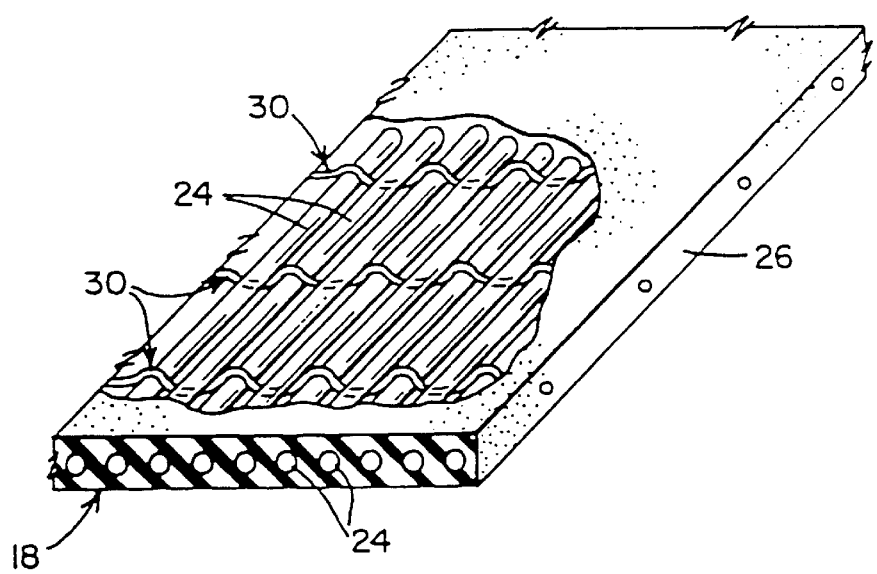
FIG. 2 is a perspective, partially cutaway view of a tire reinforcement ply used in the manufacture of the tire of FIG. 1.

With reference to FIG. 2, there is shown a portion of a carcass ply 18 prior to the assembly of the ply into a tire. The ply 18 comprises a plurality of reinforcing cords 24 disposed in parallel spaced apart relation and a plurality of gas absorbing cords 30 substantially perpendicular to the reinforcing cords and intertwined therewith, embedded in a matrix of rubber or rubber-like material 26, preferably by a conventional calendering process wherein the fabric is passed between rolls which press rubber between the cords 24 and coat the cords on both sides thereof with rubber. As will be seen from FIG. 2, each gas absorbing cord lies generally in the same plane as that defined by the reinforcing cords. It should be noted, as in apparent from FIG. 1, that the ends of the reinforcement and gas absorbing cords are not in communication with the exterior of the tire.

It is believed that the gas absorbing cords provide a path for expulsion of gas through the tread area of the tire, and gas that is not expelled is trapped within channels of the gas absorbing cord away from ply interfaces.

The reinforcing cords 24 may be of any material or construction suitable for the reinforcement of a pneumatic tire and the term "cord" is used herein, and in the appended claims, to indicate any strength member suitable for the reinforcement of a pneumatic tire. However, the invention has particular utility where the reinforcing cords are formed of a single yarn or multiple yarns twisted together and wherein each yarn is composed of continuous filaments of a thermoplastic material such as nylon or polyester of a type suitable for the reinforcement of a pneumatic tire.

Figure 3:
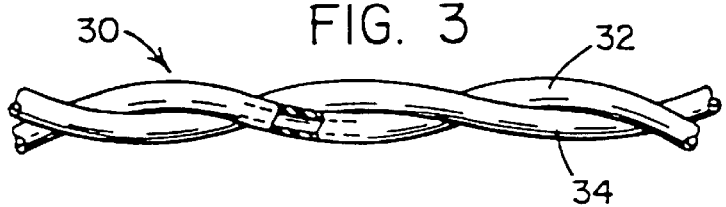
FIG. 3. is an enlarged fragmentary plan view of a gas absorbing cord of the ply of FIG. 2.

Each gas absorbing cord 30 consists of a single yarn, or as shown in FIG. 3, a plurality of yarns, such as 32 and 34, twisted together. The yarn or yarns of each cord 30 is composed of staple fibers of material selected from the group consisting of rayon, nylon, polyester or glass. The terms "rayon," "nylon," "polyester," or "glass" as used herein and in the appended claims are intended to cover any such material commonly referred to by such terms and suitable for the use in a pneumatic tire such as those that are commonly known and used presently in the reinforcement of pneumatic tires.

The gas absorbing cords 30 are not intended to contribute to the reinforcement of the tire and thus are not reinforcing cords. In this connection, each gas absorbing cord has a break strength of between about one pound and two pounds, which is no greater than about one-fifth of the breaking strength of a reinforcing cord 24. A break strength of about one pound is necessary to assure that the gas absorbing cords will not break, until necessary, under the usual tensions to which they will be subjected during manufacture of the reinforcing ply. Those skilled in the art will recognize that it is necessary to break the weft (fill) cords of the carcass ply (using a pick breaker) prior to assembly of the tire so the proper expansion (spreading) of the reinforcement cords can take place during the expansion step in the building of the tire.

As indicated above, the material of the gas absorbing cords 30 is selected from the group consisting of rayon, nylon, polyester or glass. More particularly, the gas absorbing cord 30 may be made of a single one of these materials or a combination thereof. In the cord 30 of FIG. 3, yarn 32 and yarn 34 are made of polyester staple filaments.

In a preferred embodiment, the gas absorbing cords are hollow cords and may have solid walls or perforated walls. Suitable bleeder cords that may be used in the invention are Thermax®, available from DuPont de Nemours, Wilmington, Del., and Wellkey®, available from Tejin, Osaka, Japan. Filaments of both are made of polyester, but Thermax® has solid walls whereas the Wellkey® filaments have minute holes or perforations in the walls.

Thermax® 24/1, 1.5 denier staple hollow filaments were prepared according to Goodyear's specifications by Dixie Yarn, Gastonia, N.C. into fill yarns. The Thermax® fill cords or yarns were used by Goodyear to prepare reinforcing fabric employing conventional polyester reinforcing cords in the warp direction and the Thermax® cable in the weft direction.

It is believed that the invention can be similarly practiced using 18/1 to 30/1 filaments.

In the most current prior art, particularly as described in U.S. Pat. No. 4,363,346, gas absorbing cords are run parallel and between the reinforcing cords. In a modification of the '346 patent, gas absorbing cords, for example rayon, are twisted with the reinforcing cords, for example polyester, in the cabling process (GA cords). In the prior art, the GA cords comprise about one in six of the reinforcing cords in a reinforcing ply. Since every sixth cord in the reinforcement ply is different, some non-uniformity may be observed between different reinforcing cords in the ply in a tire.

The properties of the Non GA reinforcing cords are compared to the properties of the GA reinforcing cords in Table 1 below. The first cord compared is 3000 denier and comprises 3 yarns in an 8 ½×8 ½ TPI (turns per inch) twist. The second cord is 2000 denier and comprises 2 yarns in a 12×12 TPI twist. In the tables N is Newtons, and Ult Elong is Ultimate Elongation.

TABLE 1

DIPPED CORD PROPERTIES

| | Non-GA | GA |
|---|---|---|
| | 1000/3 8 ½× 8 ½ TPI twist | |
| Break Strength, N | 216.9 | 209.3 |
| Ult. Elong., % | 16.5 | 17.0 |
| LASE at 5%, N | 60.0 | 56.9 |
| Shrinkage, % | 2.28 | 1.8 |
| Gauge | 0.026 | 0.0273 |
| | 1000/2 12 × 12 TPI twist | |
| Break Strength, N | 140.9 | 138.8 |
| Ult. Elong., % | 13.8 | 16.8 |
| LASE at 5%, N | 50.8 | 44.7 |
| Shrinkage, % | 3.9 | 2.5 |
| Gauge | 0.022 | 0.0237 |

In the manufacture of a reinforcement ply as described herein, a plurality or reinforcing cords are located in substantially a common plane in parallel spaced apart relation with a gas absorbing cord lying in the same general plane, substantially perpendicular to the reinforcing cords. All the reinforcing cords used in the ply are made in the same manner and have substantially the same properties. The reinforcing cords and gas absorbing cords are passed through a conventional calender to embed and completely surround each of the reinforcing and gas absorbing cords in rubber or rubber-like material to form the reinforcement ply.

Those skilled in the art will recognize that in some applications it is desirable that the fabric be pantographed, i e. stretched so that the angle between the reinforcing cords and gas absorbing cords is other than 90°, eg. 30°–89°, preferably 65° to 89°.

A specific example of a reinforced ply which provided a significant reduction in the number of blows or blisters in a tire in which it has been used is one wherein the reinforcing cord comprised plies which were each a 1000 denier single yarn having a twist of about 12 turns per inch as described in Table 1. The reinforcing cords were equally spaced apart with a density of 30 cords per inch. Each reinforcing cord had a gauge or diameter of approximately 0.022 inch. The gas absorbing cord used as the fill cord (yarn) consisted of hollow polyester staple fibers. The fill cords (yarn) were interwoven with the reinforcing cords and were spaced 0.75 inch apart along the length of the tire cord fabric. The fill cord (yarn) had a breaking strength of 1.7 pounds and an ultimate elongation of 15.5%. Tire fill cord had a size of 24 by the cotton count system (221.4 denier).

The ply treatment gauge was 0.042 inch.

It has been discovered that Thermax® has greater strength and elongation properties than prior art fill cords, and it has correspondingly been discovered that there are about 75% fewer loom stops during weaving. Also, there is less likelihood of fabric splitting during dipping and calendering. About 75% less fill is needed as compared to fabric prepared according to U.S. Pat. No. 4,363,346. It has also been found that in a completed tire, distribution of the reinforcing cord is more uniform when the hollow bleeder cords are used as fill, and all the reinforcing cords have uniform properties. The properties of the Thermax® cable, as compared with its prior art counterparts are illustrated in Table 2. The Randolf HWM (high wet modulus) rayon is the standard fill in the tire industry.

TABLE 2

AGING OF DIPPED FILL STRENGTH LOSS STUDY

| | BASF HWM RAYON(1) RANDOLP UNIBLEND | | TENCEL(2) THERMAX(3) COURTLAUDS DUPONT | | |
|---|---|---|---|---|---|
| | (a) | (b) | (a) | (b) | 26's |
| Greige Fill: | | | | | |
| B.S., N | 5.9 | — | 6.5 | 5.8 | 6.3 5.9 |
| S.D. | 0.5 | — | 0.5 | 0.9 | 0.7 0.4 |
| ULT. EL. % | 11.9 | — | 12.7 | 8.6 | 9.4 13.8 |
| S.D. | 1.0 | — | 0.7 | 1.2 | 0.7 1.2 |
| % SHRINK (Testrite, 215 C, 2 min.) | +0.2 | — | +0.2 | −0.4 | −0.4 +3.2 |
| Dipped Fill: (2 days) | | | | | |
| B.S., N | 6.2 | — | 6.1 | 6.5 | — 7.4 |
| S.D. | 0.8 | — | 0.8 | 0.5 | — 0.5 |
| ULT. EL. % | 8.4 | — | 9.7 | 7.0 | — 13.7 |
| S.D. | 1.2 | — | 1.3 | 0.6 | — 1.2 |
| Aged Dipped Fill: (5 weeks except * is 8 weeks) | | | | | |
| B.S., N | | * | | | |
| MEAN | 3.5 | 3.8 | 3.8* | 6.2 | — 6.4 |
| MIN | 0.2 | 0.2 | 0.3* | 5.4 | — 5.3 |
| S.D. | 3.2 | 3.2 | 2.6* | 0.8 | — 0.7 |
| ULT. EL. % | 6.4 | 6.4 | 9.1* | 8.8 | — 15.5 |
| MIN. | 0.2 | 0.2 | 0.8 | 7.4 | — 12.6* |
| S.D. | 4.9 | 4.9 | 5.4 | 0.9 | — 1.8 |

TABLE 2-continued

AGING OF DIPPED FILL STRENGTH LOSS STUDY

| | BASF HWM RAYON(1) RANDOLP UNIBLEND | | TENCEL(2) THERMAX(3) COURTLAUDS DUPONT | | |
|---|---|---|---|---|---|
| | (a) | (b) | (a) | (b) | 26's |

B.S. is breaking strength in Newtons(N).
S.D. is the standard deviation.
NOTE:
1) Randolf (control) HWM rayon: Fill sample (a) was taken from a nylon tire cord fabric roll-5 weeks old. Fill sample (1)) was taken from a nylon tire cord fabric roll-8 weeks old.
Uniblend (UMM Co.), is a source of the HWM rayon which is of higher fiber quality than that used by Randolf which is advertised for apparel use vs industrial use.
2) "Tencel", a Courtlauds trade mark for high strength rayon. Tencel "B" has a higher twist than the "A" sample.
3) "Thermax" is a DuPont trade mark for hollow polyester staple fiber.

The properties of the prior art fabric and the fabric used in the invention are illustrated in Table 3.

TABLE 3

| | DIPPED FABRIC UNIFORMITY @ | |
|---|---|---|
| @ | GA | NON GA |
| B.S., N | 209.3 | 216.9 |
| Lase @ 5%, N | 56.9 | 60.0 |
| Ult. El., % | 17.0 | 16.5 |
| Gauge | 0.0273 | 0.026 |
| Shrinkage, % | 1.8 | 2.28 |

Lase is the force required to stretch the cord 5%.

While this invention has been described above in connection with pneumatic tires which are cord reinforced elastomeric articles, it will be apparent that it is also useful in other cord reinforced elastomeric articles such as, but not limited to, airsprings.

The invention is further illustrated with reference to the following examples.

EXAMPLE 1

Fabric utilizing Thermax® weft cords was introduced into the production line to obtain data on its properties in tires. As can be seen from Tables 4 and 5 below, there was a significant drop in the number of sidewall blows that occurred in the mold and a significant improvement in the uniformity of the tires produced.

The control is polyester fabric prepared in accordance with U.S. Pat. No. 4,363,346.

EBP in the table refers to a surface precure using Electronic Beam Processing.

TABLE 4

| | Defective | | | | | | |
|---|---|---|---|---|---|---|---|
| | WEEK ENDING | | | | | | |
| | 1/20 | 1/27 | 2/03 | 2/10 | 2/14 | 2/17 | 3/2 |
| Days on Thermax | 0 | 0 | 2 | 5 some EBP | 4+ | 4 | 1 |
| Produced | 1986 | 2657 | 1688 | 2088 | 2036 | 2040 | 2138 |
| Blows (#) | 68 | 23 | 9 | 11 | 29 | 10 | 13 |
| Blows (%) | 3.42 | .87 | .53 | .53 | 1.42 | .48 | .60 |
| Liner Blisters (#) | 0 | 0 | 2 | 1 | 2 | 0 | 0 |
| Uniformity Scrap for Radial PV or Radial Harmonic (#) | 2 | 2 | 0 | 0 | 1 | 2 | 0 |

TABLE 5

| UNIFORMITY | RFV | RH1 | LFV | CON | | |
|---|---|---|---|---|---|---|
| Control (50) | 3-5 S | X 5.1 | 16.0 5.3 | 8.7 5.5 | 12.3 5.7 | 10.8 |
| Trial (Thermax) (100) | 2-15 S | X 4.3 | 14.1 4.0 | 7.5 4.2 | 13.4 8.3 | 5.0 |

1. Trial continued until 2-14 when it was noted that the ply being used had mistakenly been BP treated, This cut ply was pulled out of production on 2-15. Regular 2-ply .042 ga., odd coat distribution, was then used on this code until 2-19 when no-BP Thermax ® was again available. It then ran till 2-25.
2. There was a drop in blown/blistered sidewalls during the period when Thermax ® fabric was in use without surface BP treatment vs. control.
3. BP treating the surface of the Thermax ® material resulted in an immediate jump in blown sidewalls.
4. Visual and photographic inspection of expanded carcasses showed a much more uniform ply cord distribution with the Thermax ® ply vs. standard 2-ply material at approximately 60% expansion.
5. Radial Force Variation (RFV) and Radial 1st-Harmonic of RFV showed an improvement with Thermax ® fabric. However, the tires were built and forced at two different times, separated by weeks. This raises the question of the accuracy of the force machine correlation during the two periods.

While certain representative embodiments and details have been shown for the purpose of illustrating the invention, it will be apparent to those skilled in this art that various changes and modifications may be made therein without departing from the spirit or scope of the invention.

What is claimed is:

1. An elastomeric article comprising at least one reinforcement ply wherein said reinforcement ply includes a plurality of reinforcing cords embedded in rubber or rubber-like material, said reinforcing cords extending in parallel spaced apart relation;

the improvement wherein said reinforcing ply further includes a plurality of gas absorbing cords, said gas absorbing cords comprising yarns made of hollow staple filaments, each gas absorbing cord being used as a weft cord to hold said reinforcing cords in a stable relationship relative to one another.

2. The article of claim 1 wherein said reinforcement ply comprises woven fabric.

3. The article of claim 2 wherein each weft cord in said woven fabric is a hollow bleeder cord.

4. The article of claim 2 in which walls of said hollow staple filaments are perforated.

5. The article of claim 1 in which walls of said staple filaments are solid.

6. The article of claim 1 in which said gas absorbing cord is polyester.

7. The gas absorbing cord of claim 1 which has a shrink value of 2.5 to 3.7%.

* * * * *